(12) United States Patent
Rowe

(10) Patent No.: US 6,645,077 B2
(45) Date of Patent: Nov. 11, 2003

(54) GAMING TERMINAL DATA REPOSITORY AND INFORMATION DISTRIBUTION SYSTEM

(75) Inventor: Richard E. Rowe, Reno, NV (US)

(73) Assignee: IGT, Reno, NV (US)

(*) Notice: Subject to any disclaimer, the term of this patent is extended or adjusted under 35 U.S.C. 154(b) by 0 days.

(21) Appl. No.: 09/746,944

(22) Filed: Dec. 21, 2000

(65) Prior Publication Data

US 2002/0137217 A1 Sep. 26, 2002

Related U.S. Application Data

(60) Provisional application No. 60/242,046, filed on Oct. 19, 2000.

(51) Int. Cl.$^7$ .................................................. A63F 9/24
(52) U.S. Cl. ............................... 463/42; 463/25; 463/43
(58) Field of Search ....................... 463/1, 9–13, 16–20, 463/25, 26, 29, 30, 36, 40–43; 273/138.1, 138.2, 139, 143 R, 236, 237, 292, 293, 269, 459–461; 700/91–93; 709/200, 201, 213–221; 707/200, 203; 717/168–178

(56) References Cited

U.S. PATENT DOCUMENTS

| | | | |
|---|---|---|---|
| 4,335,809 A | * 6/1982 | Wain | 463/42 |
| 4,558,413 A | * 12/1985 | Schmidt | 707/203 |
| 4,652,998 A | * 3/1987 | Koza | 463/26 |
| 4,788,637 A | * 11/1988 | Tamaru | 709/221 |
| 4,856,787 A | 8/1989 | Itkis | |
| 5,326,104 A | * 7/1994 | Pease | |
| 5,643,086 A | 7/1997 | Alcorn et al. | 463/29 |
| 5,655,961 A | 8/1997 | Acres et al. | 463/27 |
| 5,702,304 A | 12/1997 | Acres et al. | 463/29 |
| 5,741,183 A | 4/1998 | Acres et al. | 463/42 |
| 5,742,829 A | * 4/1998 | Davis | 717/178 |
| 5,752,882 A | 5/1998 | Acres et al. | 463/42 |
| 5,759,102 A | 6/1998 | Pease et al. | 463/42 |
| 5,761,647 A | 6/1998 | Boushy | 705/10 |
| 5,800,269 A | 9/1998 | Holch et al. | 463/42 |
| 5,809,251 A | * 9/1998 | May | 717/178 |
| 5,812,857 A | * 9/1998 | Nelson | 717/173 |
| 5,820,459 A | 10/1998 | Acres et al. | 463/25 |
| 5,836,817 A | 11/1998 | Acres et al. | 463/26 |
| 5,876,284 A | 3/1999 | Acres et al. | 463/25 |
| 5,923,885 A | * 7/1999 | Johnson et al. | |
| 5,941,947 A | * 8/1999 | Brown | |
| 5,951,639 A | * 9/1999 | MacInnis | 709/220 |

(List continued on next page.)

OTHER PUBLICATIONS

Spielo Gaming International, www.spielo.com, Dec. 6, 2000.

Oracle Corporation, www.oracle.com/collateral/ent_partioning_fo.pdf, Feb., 1999.

Primary Examiner—Mark Sager
(74) Attorney, Agent, or Firm—Beyer Weaver Thomas LLP

(57) ABSTRACT

A disclosed gaming terminal data repository may be used to store game software components, game software component information and gaming transaction information for a plurality of gaming terminals owned by a plurality of gaming entities. The repository may store the game software component information and the gaming transaction information in a database partitioned according to the different gaming entities in a manner allowing a game software component configuration of a particular gaming machine to be easily analyzed and modified. Using various update triggers, game software components for gaming terminals connected to the gaming terminal data repository may be automatically updated. The gaming machines, configured or designed to receive game software components from the repository, may present game play using a combination of game software components residing on the gaming machine and the game software components received from the repository.

22 Claims, 10 Drawing Sheets

U.S. PATENT DOCUMENTS

| | | | | |
|---|---|---|---|---|
| 5,974,454 A | * | 10/1999 | Apfel | 709/221 |
| 5,999,740 A | * | 12/1999 | Rowley | 709/221 |
| 6,006,034 A | * | 12/1999 | Heath | 717/170 |
| 6,047,129 A | * | 4/2000 | Frye | |
| 6,074,435 A | * | 6/2000 | Rojestal | 717/173 |
| 6,104,815 A | | 8/2000 | Alcorn et al. | 380/251 |
| 6,106,396 A | | 8/2000 | Alcorn et al. | 463/29 |
| 6,135,887 A | * | 10/2000 | Pease | |
| 6,149,522 A | | 11/2000 | Alcorn et al. | 463/29 |
| 6,263,497 B1 | * | 7/2001 | Maeda | 707/203 |
| 6,266,810 B1 | * | 7/2001 | Tanaka | 717/173 |
| 6,282,709 B1 | * | 8/2001 | Reha | 717/175 |

* cited by examiner

GAMING TERMINAL DATA REPOSITORY AND INFORMATION DISTRIBUTION SYSTEM

CROSS-REFERENCE TO RELATED APPLICATIONS

This application claims priority under 35 U.S.C. §119(e) from co-pending U.S. Provisional Patent Application No. 60/242,046, filed Oct. 19, 2000, naming Richard B. Rowe as inventor, and titled "GAMING TERMINAL DATA REPOSITORY AND INFORMATION DISTRIBUTION SYSTEM.

BACKGROUND OF THE INVENTION

This invention relates to game playing services for gaming machines such as slot machines and video poker machines. More particularly, the present invention relates to methods of data management and configuration management for game services provided to gaming machines distributed across a gaming entity.

There are a wide variety of associated devices that can be connected to a gaming machine such as a slot machine or video poker machine. Some examples of these devices are lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, such as bill validators and coin acceptors, to accept money into the gaming machine and recognize user inputs from devices, including key pads and button pads, to determine the wager amount and initiate game play. After game play has been initiated, the gaming machine determines a game outcome, presents the game outcome to the player and may dispense an award of some type depending on the outcome of the game.

The operations described above may be carried out on the gaming machine when the gaming machine is operating as a "stand alone" unit or linked in a network of some type to a group of gaming machines. As technology in the gaming industry progresses, more and more gaming services are being provided to gaming machines via communication networks that link groups of gaming machines to a remote computer that provides one or more gaming services. As an example, gaming services that may be provided by a remote computer to a gaming machine via a communication network of some type include player tracking, accounting, cashless award ticketing, lottery, progressive games and bonus games. In addition, gaming machines are evolving into gaming platforms where the gaming services and game play options provided on the gaming machines may be dynamically configured. Thus, the number and type of game services and game play options offered on a particular gaming machine may vary regularly with time.

Within the gaming industry, a particular gaming entity may desire to provide network gaming services and track the performance of all the gaming machines under the control of the entity. The gaming machines under the control of a particular entity may be globally distributed in many different types of establishments. Casinos, convenience stores, supermarkets, bars and boats are a few examples of establishments where gaming machines may be placed. Further, gaming entities are becoming increasingly interdependent. For instance, promotions may be provided that span multiple gaming entities. As another example, mechanisms such as cashless systems are being provided that allow game players to seamlessly engage in game play across multiple gaming entities.

FIG. 1 is a block diagram depicting gaming machines distributed in different establishments partially connected by a dedicated communication network for a typical gaming entities currently operating in the gaming industry. In FIG. 1, a first gaming entity 101 utilizes a central office 142. Gaming machines, 102, 104, 106, 136 and 138 operated by the gaming entity 101 are located in casino 110 and a store 140. The store 140 may be part of route comprising gaming machines distributed in such venue sites as stores, bars and other retail establishments. The gaming machines, 114, 116 and 118 for the gaming entity 150 are located in casinos 122. A gaming entity may operate hundreds, thousands or ten of thousands of gaming machines. Since gaming is allowed in many locations throughout the world, the two casinos, 110 and 122, the central office 142 and the store may be distributed over a wide geographic area. For instance, the casino 110 may be located in Atlantic City, New Jersey, the casino 122 may be located in Australia, the central office may be located in Las Vegas, Nev. and the store may be located in Reno, Nev.

Within the casinos, the gaming machines may be connected to one or more servers via one or more dedicated networks. The servers are usually located in a backroom of the casino away from the casino floor. For instance, in casino 110, gaming machines 102, 104 and 106 are connected to a server 100 via a dedicated network 108. The dedicated network 108 may be used to send accounting information and player tracking information from the gaming machines to the server 110. In casino 122, the gaming machines 114, 116, 118 may send accounting information and player tracking information to a server 112 using the dedicated network 120. Other dedicated networks (not shown) in casinos, 110 and 112, may provide such network gaming services as bonus game play, progressive game play and cashless ticketing.

In casinos 110 and 122, the servers 100 and 112 may store and process accounting data from the gaming machines in communication with the servers. For instance, an accounting report detailing the performance of individual and groups of gaming machines may be generated from the data stored on the servers 100 and 112. In addition, accounting data or reports may be sent to the server 124 in the central office 142 from each casino. These reports may contain game performance data collected from a number of gaming machines supporting many different types of games as well as hotel operations data. The data from the casino 110 may be sent to the central office 142 using a dedicated leased line 132 using a frame relay or ATM network. The data from the casino 122 may be sent to a central office (not shown) using the communication link 133.

In some cases, the gaming entities, 101 and 150, may exchange information in some manner. For instance, a player may be issued a cashless instrument at casino 122, such as an award ticket valid for game play, the player may then utilize the award ticket at casino 110. In this example, gaming entity 150 may transfer resources to gaming entity 101, in some manner, to cover a value of the cashless instrument used by the player.

The server 124 may be used to generate reports summarizing the performance of all the gaming machines within the gaming entity (e.g. casino 110, casino 122 and store 140). The reports may be accessed locally using the local access points 126 and 128 via the local network. In addition, reports may be remotely accessed using a dial in number for a limited number of users. For instance, an executive travelling on the road might view gaming machine performance data from the remote access point 134 where the remote access point 134 may be a hotel room.

For the store 140, the gaming machines, 136 and 138 may be leased by the store operator. However, the cost of a dedicated communication network for a small number of gaming machines is usually not justified. Thus, the gaming machines operate in a "stand alone" mode. While operating in "stand alone" mode, network gaming services are not available to these gaming machines. To obtain performance data for the gaming machines, 136 and 138, a route operator may regularly extract performance data from the machines and manually transmit the information to the central office 142. A route may consist of a number gaming machines located in various locations such as bars, convenience stores and supermarkets. Usually, the route operator manually extracts performance data for all of the gaming machines located on their route. For a large route, this process may be both time consuming and costly.

Within the gaming industry, there is some desire to provide centralized network gaming services, centralized data access, centralized data analysis, centralized configuration management and centralized data acquisition to all of the gaming machines or a larger proportion of gaming machines within a gaming entity. The centralization may be provided at both the casino level and the corporate level as a means of lowering information management costs and optimizing gaming performance. A current barrier to providing the centralized services, described above, is the complexity and costs of obtaining and managing large amounts of information from a large variety of gaming machines some of which may be dynamically configurable. Further, within the gaming industry, game performance information has traditionally been closely guarded and has not been widely shared even within a gaming entity. Thus, mechanisms for data sharing on a large scale have not been generally implemented in the gaming industry. In addition, once the data is obtained, another barrier is analyzing the information and applying it in a manner which is both useful and convenient to users within the gaming entity. In view of the above, it would be desirable to provide hardware and methods for data sharing, data analysis and configuration management for gaming machines that reduce the complexity of the information management environment. Also, it is desirable for the hardware and methods to be scaleable to a large number of gaming machines and machine operators where the gaming machines and machine operators are widely distributed within a gaming entity.

SUMMARY OF THE INVENTION

This invention addresses the needs indicated above by providing a gaming terminal data repository that may be used to store game software components, game software component information and gaming transaction information for a plurality of gaming terminals owned by a plurality of gaming entities. The repository may store the game software component information and the gaming transaction information in a database partitioned according to the different gaming entities in a manner allowing a game software component configuration of a particular gaming machine to be easily analyzed and modified. Using various update triggers, game software components for gaming machines connected to the gaming terminal data repository may be automatically updated. The gaming terminals, configured or designed to receive game software components from the repository, may present game play using a combination of game software components residing on the gaming machine and the game software components received from the repository.

One aspect of the present invention provides a gaming terminal data repository. The data repository may be generally characterized as including: 1) a network interface for communicating with one or more gaming terminals, 2) a memory arranged to store gaming terminal transaction information and game software components for a plurality of gaming terminals and 3) a processor designed or configured to update game software components on the gaming terminals using one or more update triggers where a plurality of the game software components are used to present a game on each gaming terminal. The game software components may be selected from the group consisting of game system components, game paytables, game bonusing, game progressives, game graphics, game sounds, game jurisdiction information and game networking components. The processor may be designed or configured to execute one or more gaming repository applications such as a data analysis application, a configuration design application, a scheduling design application, report generation application, a query configuration application and a game software version management application.

In particular embodiments, the repository may include a firewall. The memory may be a hard drive or a CD-RW drive. The network interface may be a wireless network interface or a wired network interface where the network interface communicates with a remote gaming device. The remote gaming device may be selected from the group consisting of a printer, a portable computer, a personal digital assistant and a computer.

In other embodiments, the game presented on the gaming terminals may be a video bingo game, a video lottery game, a video black jack game, a video slot game, a mechanical slot game, a video poker game, a video keno game, a video pachinko game, a video card game and a video game of chance. The game transaction information may be stored according to one or more game data categories such as game version data, game data, gaming terminal data, player data, route data and venue data. Further, the gaming transaction information and game software component information may be stored in queryable and partitioned database.

In yet other embodiments, the gaming terminals and game software components may be owned by a plurality of gaming entities where the gaming transaction information and game software components owned by each gaming entity are stored in a separate gaming data partition in the memory. Further, gaming transaction information and game software components owned by a first gaming entity are not accessible to a second gaming entity. Access to gaming transaction information and game software components may be limited according to one or more hierarchical access privileges where the hierarchical access privileges are selected from the group consisting of site user, corporate site user, remote corporate user, venue site user, remote venue site user, route user and route site user.

Another aspect of the present invention provides a gaming machine. The gaming machine may be generally characterized as including: 1) a first combination of game software components, the first combination comprising a plurality of game software components; 2) a master gaming controller designed or configured to present a game on the gaming machine using the first combination of game software components; 3) a network interface for communicating with a remote server and receiving game software components from the remote server; and 4) processor logic for combining game software components from the first combination with game software components received from the remote server to generate a second combination of game software components where the second combination is used to present a game on the gaming machine. In addition, the gaming machine may include a memory storing a plurality of game software components where at least one of the plurality of game software components stored in the memory may be used to generate the second combination game software components. The memory may also contain game software version information for a plurality of game software components. The game software components may selected from the group consisting of game system components, game paytables, game bonusing, game progressives, game graphics, game sounds, game jurisdiction information, game networking components.

In particular embodiments, the remote server may be a gaming terminal data repository and the gaming machine may include a firewall and a modem. The network interface may be a wireless network interface or a wired network interface where the network interface is configured to allow connection of the gaming machine to an internet network or an intranet network. The intranet network may be selected from the group consisting of a cashless system network, a progressive game network, an accounting network and a bonus game network. The game presented on the gaming machine may be a video bingo game, a video lottery game, a video black jack game, a video slot game, a mechanical slot game, a video poker game, a video keno game, a video pachinko game, a video game of chance and a video card game.

Another aspect of the present invention provides, in a remote server, a method of modifying game play on a plurality of gaming machines. The method may be characterized as including: 1) determining that a configuration update has been triggered; 2) establishing communications with the gaming machine; 3) identifying one or more game software components for the configuration update on the gaming machine; 4) bundling the game software components; and 5) sending the game software components to the gaming machine where the game software components are used to present a game on the gaming machine.

In particular embodiments, the method may also include one or more of the following: a) prior to sending the game software components, contacting a local ISP and sending the game software components via the local ISP, b) looking up an IP address of the one or more gaming machines, c) encapsulating the game software components in multiple information packets, d) encrypting the game software components, e) generating instructions for configuring the game software components and sending the instructions with the game software components; f) requesting game software component version information from the gaming machines; g) receiving game software component version information from the gaming machine; h) receiving game transaction information from the gaming machines and storing the game transaction information according to one or more game data categories where the game data categories are selected from the group consisting of game version data, game data, gaming terminal data, player data, route data and venue data; i) prior to storing said game transaction information, determining access privileges for said game transaction information; j) prior to storing said game transaction information, performing one or more operations on said game transaction information, k) determining a data storage partition from among a plurality of data storage partitions for storing said game transaction information where the plurality of data storage partitions correspond to a plurality of gaming entities, l) checking a list of update triggers where the update triggers are selected from the group consisting of an update time, an update day, an update week, a game event, a game performance event and a player input.

Another aspect of the present invention provides a method for accessing game transaction information on a remote server which stores gaming transaction information for multiple different gaming entities. The method may be characterized as including: 1) receiving a request message for game transaction information from a first gaming device; 2) verifying an identity of a game transaction information requester contained in the request message; 3) determining access privileges of the game transaction information requester; 4) when said access privileges are satisfied, generating the requested game transaction information; and 5) sending the requested game transaction information specific to the gaming entity of the requester in a reply message to a second gaming device. The first gaming device may be selected from the group consisting of a gaming machine and a remote computer and the second gaming device may be selected from the group consisting of a gaming machine, a printer and a remote computer.

In particular embodiments, the method may include one or more of the following: a) generating the reply message, b) storing one or more game transaction information request parameters where the request parameters include one or more of the following: a time, a gaming terminal, a date, a game version, a game, a player, a route and a venue, c) searching a queryable database for the requested game transaction information, d) denying access to the requested game transaction information when the access privileges are not satisfied, and e) encrypting said requested game transaction information.

Another aspect of the present invention provides a method of updating game software. The method may be generally characterized as including: 1) establishing communications with a remote server; 2) receiving one or more game software components from the remote server; 3) unbundling said one or more game software components; 4) generating a combination of game software components where the combination of game software components comprise a plurality of game software components and includes the one or more game software components received from the remote server; and 5) presenting a game play using the combination of game software components where the game play is a video bingo game play, a video lottery game play, a video black jack game play, a video slot game play, a mechanical slot game play, a video poker game play, a video keno game play, a video pachinko game play, a video game play of chance and a video card game play.

These and other features of the present invention will be presented in more detail in the following detailed description of the invention and the associated figures.

DESCRIPTION OF THE PREFERRED EMBODIMENTS

Figure 1:
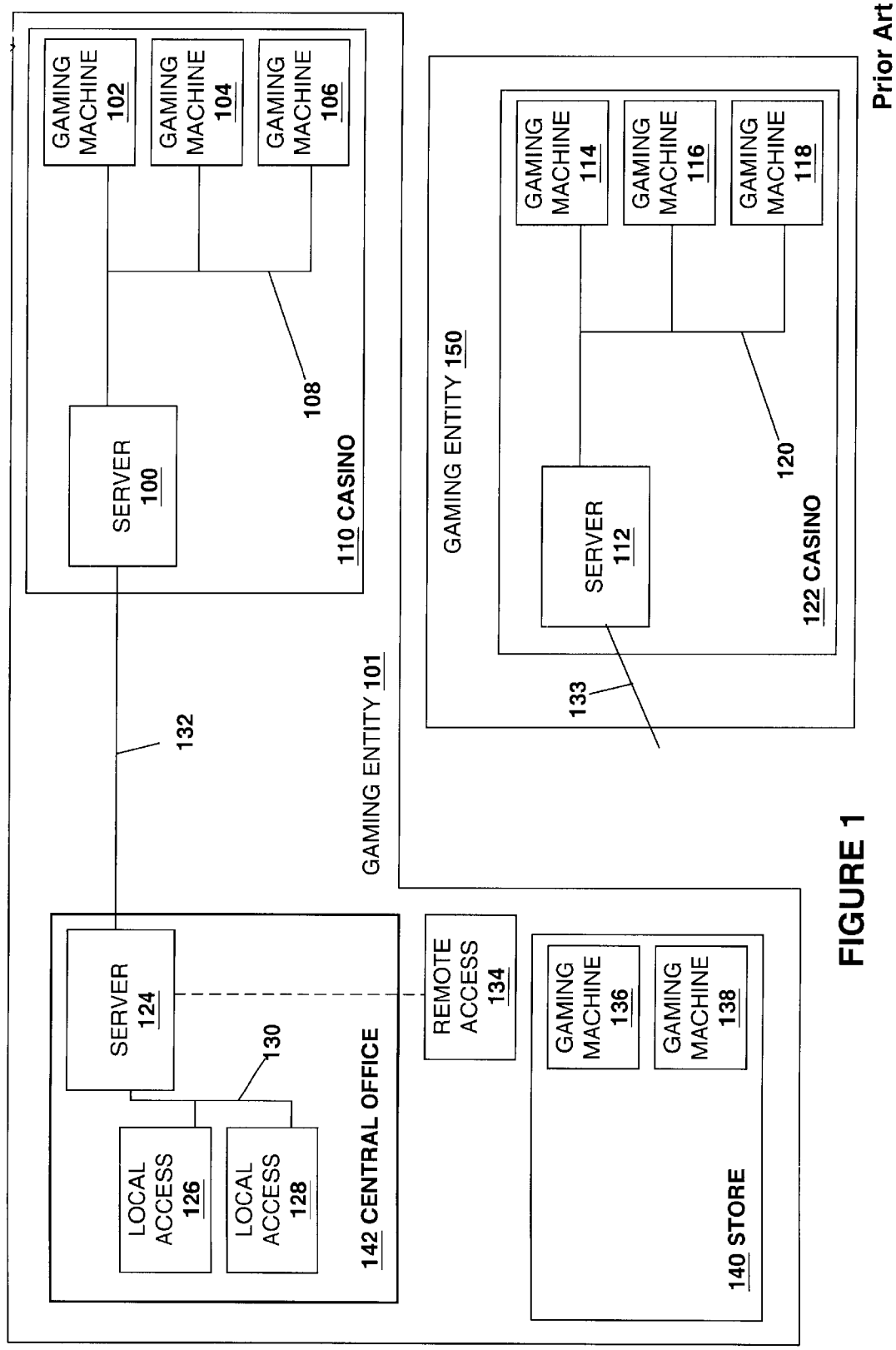
FIG. 1 is a block diagram depicting gaming machines distributed in different establishments partially connected by a dedicated communication network for typical gaming entities currently operating in the gaming industry.
Figure 2:
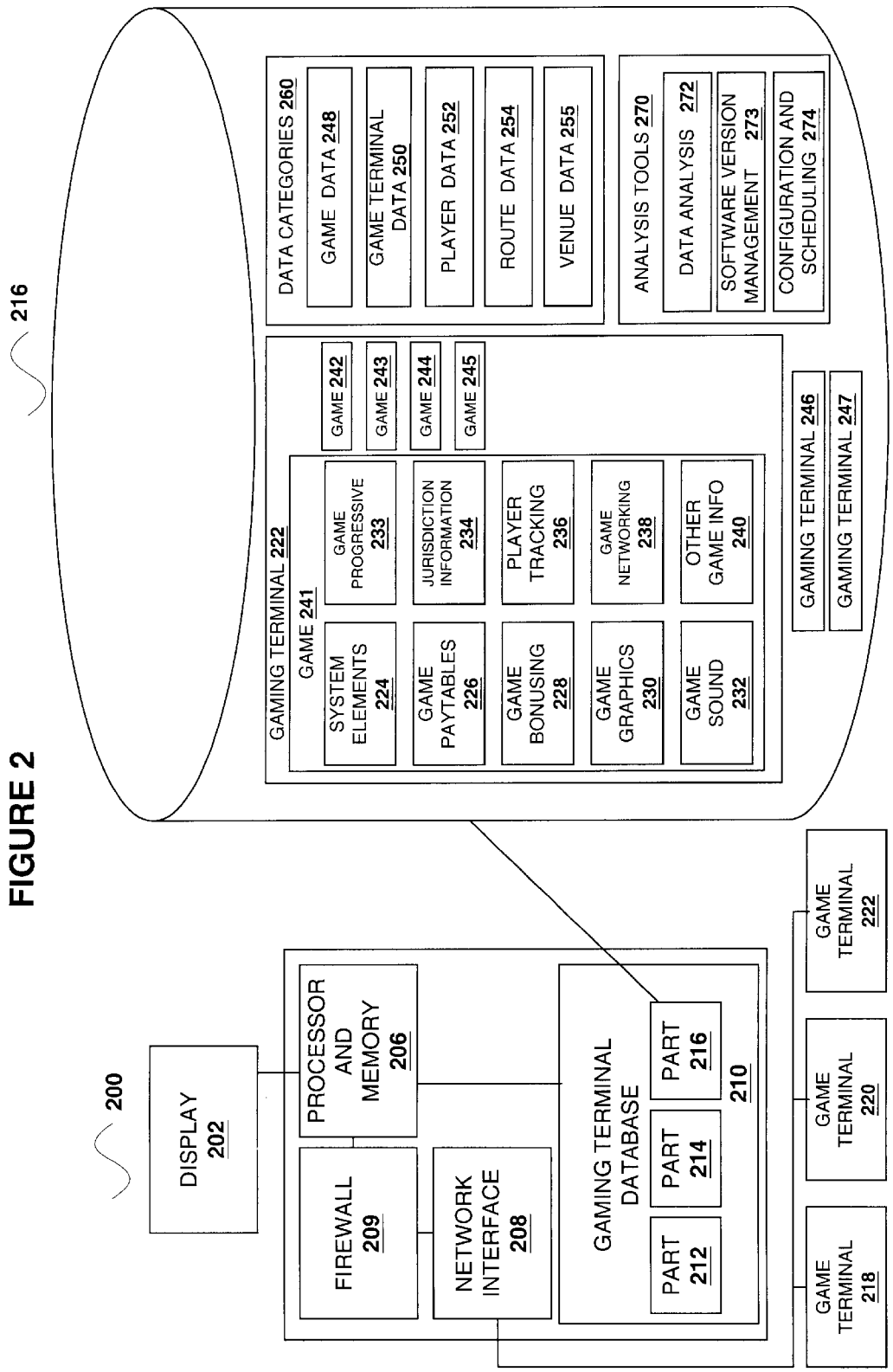
FIG. 2 is a block diagram depicting a gaming terminal data repository connected to a number of gaming terminals and a partition of a database residing within the gaming terminal data repository.

FIG. 2 is a block diagram of a gaming terminal data repository (GTDR) 200 connected via network interface 208 to a number of remote gaming terminals 218, 220 and 222. The GTDR 200 may provide the management and download tools necessary to manage all of the information associated with a particular gaming terminal or groups of gaming terminals and manage access to this data for a particular user or set of users. An operator using the GTDR 200, with the appropriate access privileges, may define various parameters that trigger the download to the gaming terminal of information and programs such as game software components. The GTDR 200 may connect with an existing network interface system, such as a cashless system within the casino, may communicate directly with gaming terminals or may use combinations of both methods to facilitate information downloading and data collection.

The gaming terminals, 218, 220 and 222, may be gaming machines such as video and mechanical slot machines and or gaming terminals providing video game play for games such as bingo games, keno games and lottery games. The gaming terminals may be located in many different venues such as casinos, stores, restaurants, bars and boats where the venues may be owned and operated by different gaming entities. For instance, gaming terminal 218 may be located in a casino owned by a first gaming entity, gaming terminal 220 may be located in a store on a route with multiple different stores owned by a second gaming entity and gaming terminal 222 may be located on a floating casino owned by a third gaming entity.

The gaming terminals 218, 220 and 222 may send game transaction information, such as coin-in and coin-out, game software component information, such as the versions of software residing on each gaming terminal and the version of a game being played, and player tracking information, such as the identity of a player playing a game on the gaming machine. The gaming terminals 218, 200 and 222 may send and may receive information directly from the GTDR 200 or the gaming terminals may communicate with the GTDR 200 via an intermediate device such as a cashless system server. Information received from the gaming terminals may be archived in the gaming terminal database 210 on the GTDR. In addition, the GTDR 200 may poll various servers such as bonus game servers, cashless system servers, progressive game servers for gaming information that may stored in the gaming terminal database 210.

The GTDR 200 may communicate with the gaming terminals, 218, 220 and 222 and other remote gaming devices, such as portable computers, printers, personal digital assistants and computers located at various gaming venues, using the network interface 208. The network interface 208 may be a wireless network interface or wired network interface. The GTDR 200 may utilize a firewall 209 to prevent unauthorized access to data stored in the GTDR 200. Access firewalls may provided by CISCO Systems (San Jose, Calif.).

The GTDR 200 stores gaming information, such as gaming transaction information, game software components and game software component information, in a partitioned gaming terminal database 210. In one embodiment, the information stored in the gaming terminal database may be partitioned according to gaming entities. For instance, gaming information from a first gaming entity be may stored in a first partition of the gaming terminal database 212, gaming information from a second gaming entity may be stored in a second partition 214 and gaming information from a third gaming entity may be in a third partition 216. The number of partitions may vary and is not limited to the three partitions described in the present example. The gaming terminal database 210 may be a hard drive, CD-Read/Write drive or any other storage medium or combinations of storage mediums appropriate for storing large amounts of game information.

The large amount data and variety of game programs on each gaming terminal may be managed using the data and program management tools of the GTDR 200. Each game program may comprise of plurality of game software components. In FIG. 2, each of the items may be associated with a particular gaming terminal or associated with a type of gaming terminal. The items may be organized in a database structure of some type which may be extended to a large number of gaming terminals. Many different types of database structures are possible. Some examples of database structures which may be utilized are described in the text "Database Management Systems," R. Ramakrishnan, Mcgraw-Hill, which is incorporated herein by reference in its entirety and for all purposes.

An advantage of using a database partitioned according to a number of gaming entities may be easier sharing of data between gaming entities allowing for seamless game play across different gaming entities and promotions involving multiple gaming entities. Another advantage may be less expensive information management costs because multiple gaming entities may share the information manage costs rather than each entity performing its own information management. Further, within a gaming entity, information management costs may be lowered because information management for a particular entity may be centralized. Yet another advantage of the partitioned database is scalability. The partitioned approach is scaleable to large numbers of gaming terminals. Further, when gaming information is stored for a large number of gaming terminals, gaming terminal configuration performance patterns may emerge that are not readily seen when information is only stored for a small number of gaming terminals.

The associations between gaming terminal database elements and the gaming terminals may be managed and leveraged with specific GTDR 200 tools that utilize information that may be stored in the data repository such as within a database structure of some type. For instance, the system may be used to establish relationships between users, terminal information, site information, and gaming terminals. With a given set of relationships established using the system, the casino operator may then identify the configuration desired of a particular gaming terminal or groups of gaming terminals. An example of the structure, relationships and types of information that may be stored in a data partition 216 for a particular gaming entity is shown in the FIG. 2. The example is used for illustrative purposes as many different structures are possible and additional gaming information may be stored in the database 210.

For each gaming terminal, including 222, 246 and 247, game software component information for various potential game configurations on the gaming terminal may be stored. For instance, gaming terminal 222 may be configured for 5 different types of games including 241, 242, 243, 244 and 245. The 5 games might correspond to five types of video slot games, 5 types of video poker games, or 2 types of video slot games and 3 types of video black jack games. The number of games on a given terminal and the combinations of games may vary. Game software components and game software component information for other video games of chance, including video bingo games, video lottery games, mechanical slot games, video keno games, video checkers and video card games may also be stored in the GTDR 200.

For each game, game software component information may be listed for game software components that reside on the gaming terminal. The game software component information may correspond to a particular game software configuration residing on the gaming terminal as well as potential configurations of software for the gaming terminal. For example, for game 241, the game software component information includes game system components 224, game paytables 226, game bonusing 228, game graphics 230, game sounds 232, game progressives 233, jurisdiction information 234, player tracking 236, game networking components 238 and other gaming information. Under each category, multiple different game software components may be available. Some of the game software components, such as game graphics 230 or game sounds 232, may be specific to a particular game while other game software components, such as game networking 238, may be shared by multiple different games. For instance, a video slot game and a poker game may use different graphics and sounds but the same player tracking software components. Examples of different game software components for each type of game software component are described with reference to FIG. 3.

The GTDR 200 may receive various types of game transaction information from gaming terminals connected in some manner to the GTDR 200. The game transaction information may be used to determine the relative performance of different games and gaming terminals. The game transaction information may be stored in a relational database allowing search and queries of various different data categories 260. The data categories may be specify various data relationships. For instance, game transaction information, such as coin-in, coin-out, and amount bet per game, may be stored according to specific games as game data 248. The game data may be a composite of game data obtained from multiple gaming terminals operating at different locations. Many data fields may be associated with the game data such as the time, game version, location, gaming terminal and player, and stored as a data record. The data fields may be utilized by analysis tools residing in the GTDR 200 to generate various information relationships such as game performance as a function of time, game performance as a function of location, game performance as a function of game version and game performance as a function of player.

The data categories 260 may be used to store commonly accessed data combinations to minimize analysis times. Many different combinations of game transaction information and other game information for various groups of gaming terminals may be stored in the gaming terminal database 210 as a queryable database. Other examples of game data categories may include: 1) gaming terminal data 250, which may be a history of game performance on a particular gaming terminal for all of its past configuration, 2) player data 252, which may be a composite of a player's game play on many different gaming terminals, 3) route data 254 which may be a composite of gaming terminal information for a group of gaming terminals on a route comprising a number of gaming venues such as stores and 4) venue data 255 which may be a composite of terminal information for a groups of gaming terminals at a particular venue such as a casino, a subset of gaming terminals within a casino, a store or a restaurant. Again many types of data categories may be possible. The number of potential data categories may depend on the number of fields associated with each data record obtained from a gaming terminal and a processing power of the GTDR 200 because too many data categories may result in a degradation of search performance on the GTDR 200.

The processor and memory 206 on the GTDR 200 may be used to execute a number of analysis tools 270 (e.g. gaming repository applications) residing in each data partition, including 212, 214 and 216 in the gaming terminal database 210. The gaming repository applications 270 as well as the game transaction information and game software components stored in the gaming terminal database 210, may be proprietary and in some cases may not be shared by different gaming entities. The analysis tools 270 may utilize a number of user interfaces such as graphics tools for presenting data generated in each application. For instance, an interface may display the current game software components on a gaming terminal as highlighted in a list of game software components available on the gaming terminal. These interfaces may be viewed on displays, including 202, or remote computers which are connected to the GTDR 200.

The gaming repository applications 270 may include: 1) data analysis applications 272, which may be used to establish data categories and various relationships between data categories, 2) version management tools 273, which may be used to identify the game software components on a particular gaming terminal and then update one or more game software components by downloading game software components from the GTDR 200, 3) configuration and scheduling tools 274, which may be used to automatically configure one or more gaming terminals according to one or more scheduled update triggers, 4) query configuration application, which may be used to design query relationships in the database that are suited to a particular users needs and 5) report generation applications for formatting game transaction information. The gaming repository application 270 are not limited to these applications and many types of gaming repository applications are possible.

Data from the various applications executed on the GTDR 200 may be shared and utilized by other applications. For instance, the data analysis tools 272 may be used to establish relationships between game versions, game transaction information, site information and gaming terminal information. The relationships may be utilized by the configuration application 274 to establish configurations for one or more gaming terminals. The configuration application may identify the current set of game software components used for game play on a particular gaming terminal and then compare the identified software components with game software components required for a new game configuration (e.g. a plurality of game software components are used to present a game presentation on each game presentation). The result of the comparison may be a list of game software components that need to be updated on the gaming terminal to enable the new game configuration. The configuration management tool 274, which is executed by the processor 206, may then download the game software components required for the new game configuration to the gaming terminal via the network interface 208. A similar process may be used by the software version management to update versions of software residing on one or more gaming terminals.

The scheduling tools may be used to automatically update the configurations of one or more gaming terminals according to a number of update triggers. Updates might be triggered at certain times, such as hourly, daily or weekly, according to player input, or according to game performance. For instance, when a game is performing poorly on a gaming terminal, game software components to enable a new version of the game being played or a different game may be downloaded to the gaming terminals connected to the GTDR 200. The gaming performance of the gaming terminals may be monitored by the GTDR 200 so that the download may be performed automatically. As another example, different paytables may be downloaded to different gaming terminals at specific times of the day to encourage game play during off-peak hours or increase profits during peak hours. Yet another example, the GTDR may download new game software components to a particular gaming terminal being utilized by a particular player. The download may occur as a result of a data analysis indicating personal game playing preferences of a particular player such as liking particular sounds or graphics. The download may occur automatically without being initiated by the player or may be initiated by the player.

In the past new games have been installed in gaming machines by exchanging an EPROM in the gaming machine containing all of the gaming software or by downloading an entire game software package. In these examples, all the gaming software on the gaming machine is exchanged whether or not it is different from the new gaming software. An advantage of only downloading specific game software components is that it allows for faster downloads when only a small fraction of the gaming software is being updated. Also, in many cases, the gaming machine may continue to operate while the download is implemented. When all of the gaming machine software is downloaded, the gaming machine may have to brought down for the installation. Further, for a game with many different versions where the variation from version to version may be small, it is more efficient to manage and store the individual game software components rather than many different game software versions with each version comprising all of the game software components.

Figure 3:
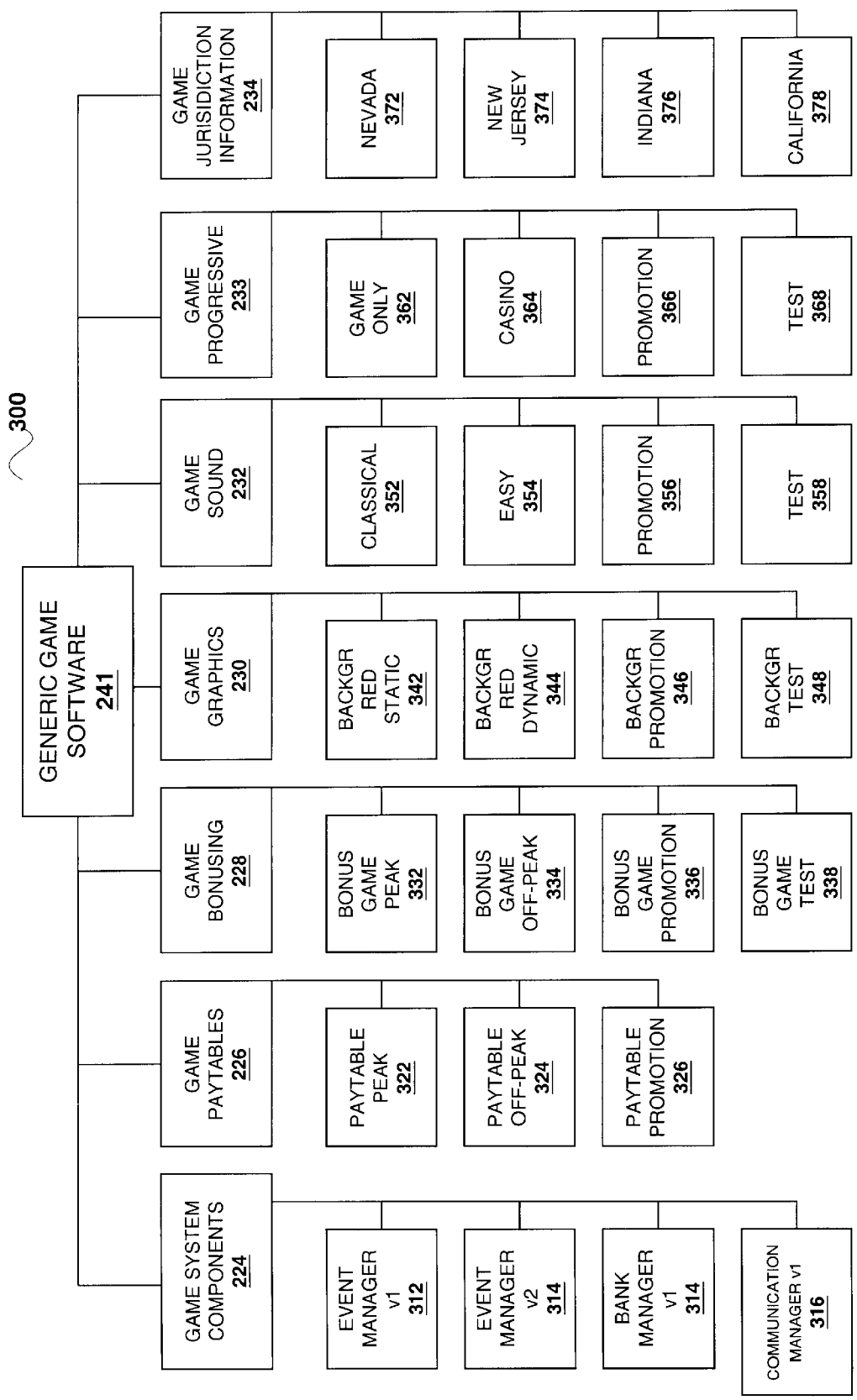
FIG. 3 is block diagram of game software components that may be allocated to particular gaming terminals using a gaming terminal data repository.

FIG. 3 is block diagram of game software components that may be allocated to particular gaming terminals using a gaming terminal data repository 200. An example of game software components for a particular game 241 was described with reference to FIG. 2 and components that appear in FIG. 2 are identified by common reference numerals. In FIG. 3, the game software components 300 may be displayed as menu containing game software component information. The menu, which may be generated as part of game repository application, may be used by an operator using the GTDR 200 to configure a particular gaming terminal connected to the GTDR with a particular game. The menu items may correspond to game software components stored on the GTDR 200.

The game system components 224 may comprise software modules used to provide various system functions on the gaming terminal. For instance, the event manager 312 may be used to monitor and distribute events occurring on the gaming machine such as card-in, card-out, power hit and tilt. The bank manager 315 may be used to perform accounting functions on the gaming terminal. The communication manager 316 may be used to provide communication protocols allowing different gaming devices to communicate with the gaming terminal such as player tracking devices. Another example of gaming system components might include device drivers allowing the gaming system software to communicate with various devices connected to the gaming terminal such as displays, bill validators, ticket readers, coin acceptors, card readers and printers. Details of game system components that may be used in the present invention are described in co-pending U.S. patent application Ser. No. 09/642,192 entitled a GAMING MACHINE VIRTUAL PLAYER TRACKING AND RELATED SERVICES filed Aug. 18, 2000 by LeMay, et al. the entire specification of which is incorporated herein by reference.

Different versions of the game system components may be stored on the GTDR 200. For instance, two versions of the event manager, 312 and 315, may be stored on the GTDR 200. The second version may be a software update of the first version. Using the GTDR 200, software versions on one or more gaming terminals may be automatically updated. In addition, the GTDR may store device drivers for many types of devices. For example, many different versions a player tracking devices exist. The GTDR 200 may store device drivers for these devices such that, when a new player tracking device is installed on a gaming terminal, the GTDR 200 may be used to download software to the gaming terminal enabling operation of the new player tracking device.

The game paytables 226, which may be downloaded to a gaming terminal, includes a paytable peak 322, a paytable off-peak 324 and a paytable promotion 326. The paytable peak 322 may correspond to a particular set of odds for peak game playing times. Paytable off-peak may correspond to a particular set of odds for off-peak playing times 324. For instance, during off-peak playing times, a bigger jackpot may be available on certain gaming terminals that is not available during peak game playing times to attract addition game play. The paytable promotion 326 may correspond to a particular set of prizes that is available during promotional periods. For example, the paytable promotion might be downloaded at random times during the day to add excitement to game play on one or more gaming terminals. The GTDR 200 may include configuration and scheduling applications allowing random downloads to be performed automatically.

The game bonusing 228, which may be downloaded to a gaming terminal, include bonus game peak 332, bonus game off-peak 334, bonus game promotion 336 and bonus game test 338. A large variety of bonus games are possible. The bonus game peak and bonus game off-peak may have been selected based upon game performance data stored on the GTDR. The bonus game test 338 may be downloaded to gather gaming performance data on a particular bonus game. For example, to try out a new bonus game that has been developed.

The game graphics 230 and game sound 232, which may be downloaded from the GTDR, include background red static 342, background red dynamic 344, background promotion 346, background test 348, classical 352, easy 354, promotion 356 and test 358. The GTDR 200 may contain analysis tools that allow the game graphics and game sounds on a group of gaming terminals to be directed to a particular age group. For example, older men may prefer a red dynamic background 344 and classical music 352 while older women may prefer a red static background 342 and easy music 354. Thus, the GTDR 200 may include scheduling tools that use update triggers such as the time of day to automatically download game graphics 230 and game sound 232 to attract particular groups of people at certain times of day.

Specific update triggers may be determined based upon a demographic analysis of game performance data (e.g. game transaction information) and user data (e.g. player tracking information) stored in the GTDR. The demographic analysis may be performed using software executed on the GTDR. The software may indicate that certain groups of individuals are more likely to play certain types of games at certain times of day. Thus, update triggers may be developed and implemented on the GTDR that configure gaming terminals with certain games at certain times corresponding to the preferences of a particular demographic group.

The game progressive 233 game software components may allow a user to configure groups of gaming terminals into different progressive game groups. For instance, the game only progressive software 362 may be downloaded from the GTDR 200 to a group of gaming terminals presenting the same game such as a particular version of a video slot game. The game only progressive 362 may enable a progressive game for game players playing only the particular version of the slot game designated by the game only progressive 362. As another example, a casino progressive software may allow a gaming terminal to be configured as part of casino wide progressive game involving a number of gaming terminals throughout the casino. Also, promotional progressive games 366 and test progressive games 368 may be downloaded from the GTDR 200.

The game jurisdiction information 234 game software components may be used to configure a gaming terminal for a particular gaming jurisdiction. Different gaming jurisdictions may have different rules in regards to the maximum amount of wagers that may be made on a particular game or the types of paytables that may be used in a particular game. For instance, the GTDR 200 may store gaming jurisdiction configurations for Nevada 372, New Jersey 374, Indiana 376 and California 378. Thus, with the GTDR 200, a generic gaming terminal may be shipped to a particular jurisdiction and then may be configured remotely using the GTDR 200. Thus, when the gaming terminal is installed in Nevada, a Nevada configuration is used. The remote configuration capability may significantly reduce the resources needed to install gaming terminals that may be sold to different jurisdictions.

The game software components 300 listed in the FIG. 3 may appear to the operator as a menu on a display screen where the current game software configuration of the gaming terminal is highlighted in some manner. For instance, a current game software configuration may comprise: 1) a first versions of the event manager 312, bank manager 314, and communication manager 316, 2) a bonus peak game 332, 3) a red dynamic background 344, 4) easy music 354, 5) a game only progressive 362 and 6) a Nevada gaming jurisdiction configuration. The current game software configuration may be highlighted on the screen as a particular color. By pointing to the screen using a mouse or some other device, an operator may highlight particular boxes to adjust the configuration of a particular gaming terminal or a group of gaming terminals. In addition, the menu may include configuration templates corresponding to a number of gaming terminal configuration options that may be selected by the operator. These templates may be proprietary and based upon an analysis of game performance data available to a particular gaining entity.

Figure 4:
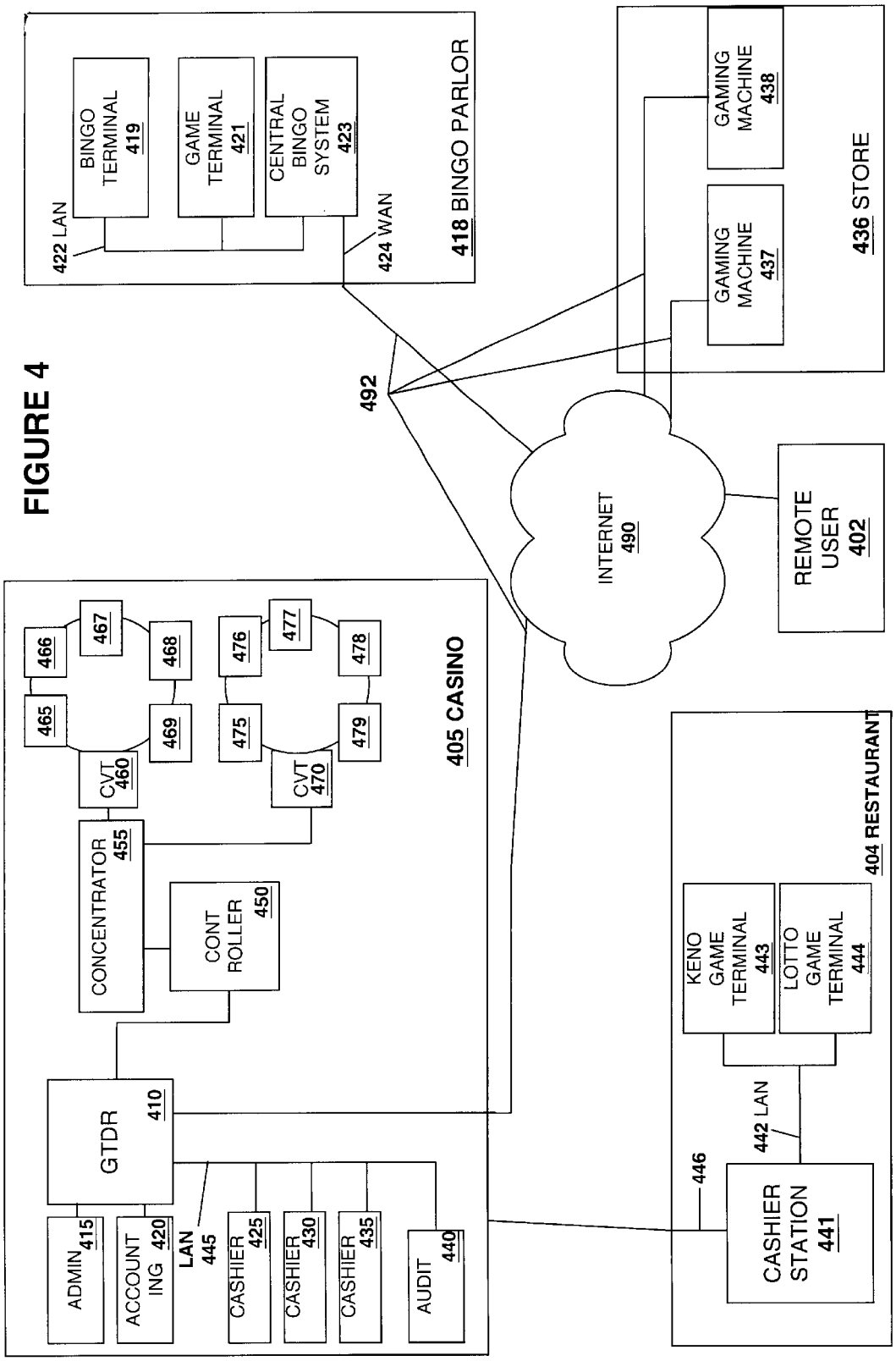
FIG. 4 is a block diagram of venues and route sites with gaming terminals connected to a gaming terminal data repository.

FIG. 4 is a block diagram of venues and route sites with gaming terminals connected to a gaming terminal data repository. In FIG. 4, gaming machines, 465, 466, 467, 468, 469, 475, 476, 477, 478, and 479, residing in the casino 405, gaming terminals, 419 and 420, in the bingo parlor 418, gaming machines, 437 and 438, in the store 436, a remote user 402, and gaming terminals, 443 and 444, in the restaurant are connected to a GTDR 410 located in the casino 405. The gaming machines and gaming terminals are connected to the GTDR 410 via a local area networks, via the Internet 490 and via a secure private intranet 446. In FIG. 4, the communication connection configuration represents one of many potential connection schemes possible with the present invention. Also, the GTDR 410 may be located other locations besides the casino 405. For instance, the GTDR could be located in a separate location containing the GTDR and its support infrastructure or the GTDR might be located in a corporate headquarters for a particular gaming entity.

In one embodiment, gaming machines, gaming terminals or remote users may communicate with the GTDR 410 via the Internet. For instance, the gaming machines, 437 and 438, may contain a wireless modem or wired modem allowing the gaming machines to contact a local Internet Service Provider (ISP) and communicate with the GTDR 410 via the Internet. The GTDR 410 may also connect with the Internet via a local ISP. Using the connection with the GTDR 410, the gaming machines maybe able to send game transaction information to the GTDR 410 and receive game software downloads from the GTDR 410.

The gaming machines, residing in the store, may be part of route comprising a number of gaming machines located in different stores. A remote user 402, such as a route operator for the store 436, may also be able to contact the GTDR 410 via a local ISP. Using the GTDR 410, a route operator or other remote user may be able to obtain reports on gaming machine performance, perform data analysis on a group of gaming machines, such as 437 and 438, remotely configure gaming machines via game software component downloads, as well as utilize any other applications available on the GTDR.

Gaming terminals and gaming machines may also communicate with the GTDR 410 via an intermediate device. For example, in the bingo parlor 418, the bingo terminal 419 and the gaming terminal 421, communicate with the central bingo system 423 via the LAN 422 in 418. The central bingo system 423 may send gaming terminal transaction information received from 419 and 421 using a wide area network interface 424 and an Internet connection 492 to connect to the Internet 490. Also, the central bingo system 423 may forward game software components downloads received from the GTDR 410 to gaming terminals connected to the central bingo system 423 including the bingo terminal 419 and the gaming terminal 421. As another example, in the restaurant 404, the keno gaming terminal 443 and the lotto gaming terminal 444 may communicate game transaction information to the cashier station 441 via the local area network 442. The cashier station 441 may forward the gaming transaction information via a private leased line 446 directly connected to the GTDR 410. Using the private leased line 446, the GTDR 410 may download game software components to the keno gaming terminal 443 and the lotto gaming terminal 444 via the cashier station 441 and the LAN 442.

In one embodiment, communications between the GTDR and other gaming devices over the Internet 490 may be implemented using an IP based Virtual Private Networks (VPNs). An Internet-based virtual private network (VPN) uses the open, distributed infrastructure of the Internet to transmit data between various sites. A VPN may emulate a private IP network over public or shared infrastructures. A VPN that supports only IP traffic is called an IP-VPN. Virtual Private Networks provide advantages to both the service provider and its customers. For its customers, a VPN can extend the IP capabilities of a central data site, such as the GTDR 410, to remote venue sites, such as the bingo parlor 418, restaurant 404, store 436, and/or users, such as the remote user 402 or a user operating from a particular venue site, with intranet, extranet, and dial-up services. This connectivity may be achieved at a lower cost to the gaming entity with savings in capital equipment, operations, and services.

There are many ways in which IP VPN services may be implemented, such as, for example, virtual leased lines, virtual private routed networks, virtual private dial networks, virtual private LAN segments, etc. Additionally VPNs may be implemented using a variety of protocols, such as, for example, IP Security (IPSec) Protocol, Layer 2 Tunneling Protocol, Multiprotocol Label Switching (MPLS) Protocol, etc. Details of these protocols including RFC reports may be found from the VPN Consortium an industry trade group (http://wwwspnc.com, VPNC, Santa Cruz, California). Details of VPNs and related communication methods that may be used In the present invention are described in co-pending U.S. patent application Ser. No. 09/732,650 entitled a SECURED VIRTUAL NETWORK A GAMING ENVIRONMENT filed Dec. 7, 2000 by B. Nguyen the entire specification of which is incorporated herein by reference.

Components of a cashless system may include 1) data acquisition hardware, 2) data storage hardware, 3) cashless instrument generation and validation hardware (e.g. printers, card readers, ticket acceptors, validation terminals, etc.), 3) auditing software, 4) cashless instrument validation software and 5) database software. Many types of cashless systems are possible and are not limited to the components listed above or embodiments such as the EZ pay ticket voucher system. Typically, a cashless system is installed at each property utilizing cashless instruments. To allow multi-site validations of cashless instruments, the cashless systems at each property may be linked to a cashless instrument transaction clearinghouse. Using the cashless instrument clearinghouse, the GTDR 410 may obtain gaming transaction information from multiple gaming entities.

Returning to FIG. 4, a first group of gaming machines, 465, 466, 467, 468, and 469 is shown connected to a first clerk validation terminal (CVT) 460 and a second group of gaming machines, 475, 476, 477, 478 and 479 is shown connected to a second CVT 470. All of the gaming machines print ticket vouchers which may be exchanged for cash or accepted as credit of indicia in other gaming machine located within the property 405. In this example, the ticket voucher serves as a cashless instrument. In addition, the gaming machines may contain smart card readers for reading voucher information stored on smart cards.

The CVTs, 460 and 470, store cashless instrument transaction information corresponding to the outstanding cashless instrument, including ticket vouchers, smart cards and debit cards, that are waiting for redemption. In addition, cashless instrument transaction information may be stored in a cashless server and GTDR including the GTDR 410. The cashless instrument transaction information may be used when the vouchers are validated and cashed out or redeemed in some manner. The CVTs 460 and 470 may store the information for the ticket vouchers printed by the gaming machines connected to the CVT. In addition, the CVTs 460 and 470 may store the information for vouchers stored on a smart card or other types of cashless instruments that were generated on each gaming machine. For example, CVT 460 stores voucher information for vouchers issued by gaming machines 465, 466, 467, 468, and 469.

In this embodiment, when a player wishes to cash out a voucher, the player may redeem vouchers issued from a particular gaming machine at the CVT associated with the gaming machine or any other CVT which is part of the cashless system associated with the CVT. For example, since CVT 460 and CVT 470 are connected as part of a single cashless system to the GTDR 410, a player may redeem vouchers or utilize vouchers at the gaming machines, the CVT's (460 or 470), the cashiers (425, 430, 435, and 440) or the wireless cashiers 458. The CVTs, cashiers, wireless cashiers and gaming machines may be referred to as "cashless validation sites."

Using the cashless system network, multiple groups of gaming machines connected to CVTs are connected together in a cross validation network 445. The cross validation network is typically comprised of one or more concentrators 455 which accepts inputs from two or more CVTs and enables communications to and from the two or more CVTs using one communication line. The concentrator is connected to a front end controller 450 which may poll the CVTs for voucher information. The front end controller is connected to GTDR 410 which may provide a variety of information services for the cashless system including accounting 420, administration 415, as well as GTDR functions such as downloading game software components to the various gaming machines connected to the system.

As cashless instruments are validated, the information may be sent to audit services computer 440 providing audit services, the accounting computer 420 providing accounting services or the administration computer 415 providing administration services. In another embodiment, all of these services may be provided by the GTDR 410. Examples of auditing services, which may be provided by the GTDR 410 include 1) session reconciliation reports, 2) soft count reports, 3) soft count verification reports, 4) soft count exception reports, 5) machine voucher status reports and 5) security access report. Examples of accounting services, which may be provided by the GTDR 410 include 1) voucher issuance reports, 2) voucher liability reports, expired voucher reports, 3) expired voucher paid reports and 4) voucher redemption reports. Examples of administration services, which may be provided by GTDR 410 include 1) manual voucher receipt, 2) manual voucher report, 3)

voucher validation report, 4) interim validation report, 5) validation window closer report, 6) voided voucher receipt and 7) voided voucher report.

Figure 5:
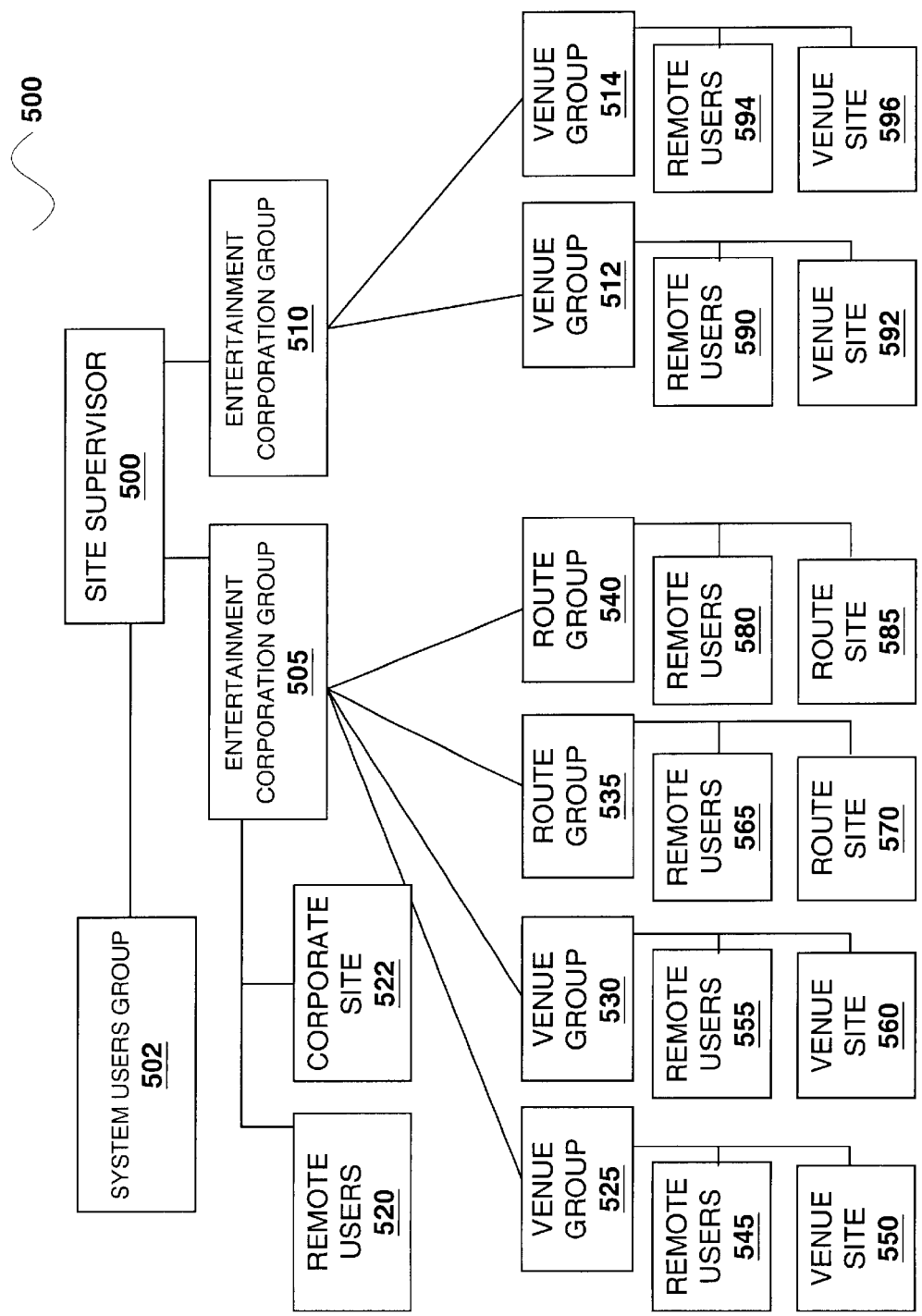
FIG. 5 is a block diagram of hierarchical access groups that may be used to control data access in a gaming terminal data repository containing gaming transaction information from multiple different gaming entities.

FIG. 5 is a block diagram of one example of hierarchical access groups that may be used to control data access in a gaming terminal data repository containing gaming transaction information from multiple different gaming entities. As previously described, with a GTDR, data may be obtained from multiple different gaming entities and may be stored in a partitioned database. Once gaming information is stored in the database different users may be assigned different access privileges to the gaming information and services available on the GTDR. This capability may allow a user, such as a route operator, to pay for a service such as accounting for all of the gaming terminals operated by the user. As another example, a user of the GTDR may desire some form of data mining service which provides real-time marketing data related to game or site.

In FIG. 5, all of the information and applications available on the GTDR may be accessible to a site supervisor 500. Members of the systems users group 502, which may include the site supervisor 500, may have site supervisor privileges for the entire GTDR or may have site supervisor privileges for one or more data partitions within the GTDR. The members of the systems users group typically manage the GTDR system functions and applications. For instance, members of the system user group 502 may allocate the size of partition, may perform backups and may provide application trouble shooting.

Under the site supervisor group 500, a number groups relating to gaming entities, including an entertainment corporation group 505 and an entertainment corporation group 510, may reside. Gaming transaction information and repository applications, which may be proprietary to each gaming entity, may be stored in a separate data partition on the GTDR. For instance, a first data partition may be allocated to the gaming entity corresponding to the entertainment corporation group 505 and a second data partition may be allocated to the gaming entity corresponding to the entertainment corporation group 510. The number of groups and access privileges may vary from gaming entity to gaming entity. The number of groups and the hierarchical group relationships may depend on the number of venues in the gaming entity, such as the number of casinos, information access policies formulated by each gaming entity and the types of group access privileges available on the GTDR. Many examples of group hierarchies are possible and are not limited to the example in FIG. 5.

The entertainment corporation 505 consists of two venues, such as two casinos, and two routes where each route may comprise multiple venues such as stores or bars. For the entertainment group 505, remote corporate users 520 and corporate site user 522 may access all of the game information and repository applications available to the entertainment corporation group 505. For instance, a corporate site user may be able to remotely configure gaming terminals at the two venues and on the two routes, execute data analysis tools using gaming information obtained from these sites and obtain reports regarding each of the venues and routes. As described with reference to FIG. 4, a remote user may be able to obtain remote access to the GTDR via an Internet connection or a private intranet.

Under the venue groups 525 and 530, remote users, 545 and 555, and venue site users, 550 and 560, associated with the venue corresponding to the venue group, 525 and 530, may be able to access gaming information for the particular venue associated with their group. The remote users, 545 and 555, and venue site users, 550 and 560, may be able to access all of the applications available to the entertainment corporation group 505 or a subset of the application available to the entertainment corporation group 505. However, users in the venue group 525 may not be able to access all of the information and all the applications available to the venue group 530. Further, users in the venue group 530 may not be able to access all of the information and all the applications available to the venue group 525.

Under the route groups, 535 and 540, remote users, 565 and 580, such as route operators, may be able to access gaming information for all the route sites associated with their route group. For instance, a route may consist of 5 stores with gaming terminals in each store. Thus, a route operator may have access to gaming information generated from the gaming terminals in the 5 stores on their route. The route site users, 570 and 580, may be only able to access gaming information for the particular route site corresponding to their route site group and may not be able to access information at other route sites on their route or other route sites on different routes. Thus, using the example of the route with 5 stores, a route site user at one store may have access to gaming information generated at their store but not at the other 4 stores on their route.

Under the site supervisor group 500, another example of an entertainment corporation group 510 is shown. The entertainment corporation group 510 consists of two venue groups, 512 and 514, with remote users, 590 and 594, and venue site users, 592 and 596, for each venue group. The entertainment corporation group 510 does not contain any corporate site users. Thus, in this example, users in each venue group, 512 and 514, may access game information generated at their venue site. However, no users within the entertainment group 510 are able to see all of the game information generated from both venue sites.

Figure 6A:
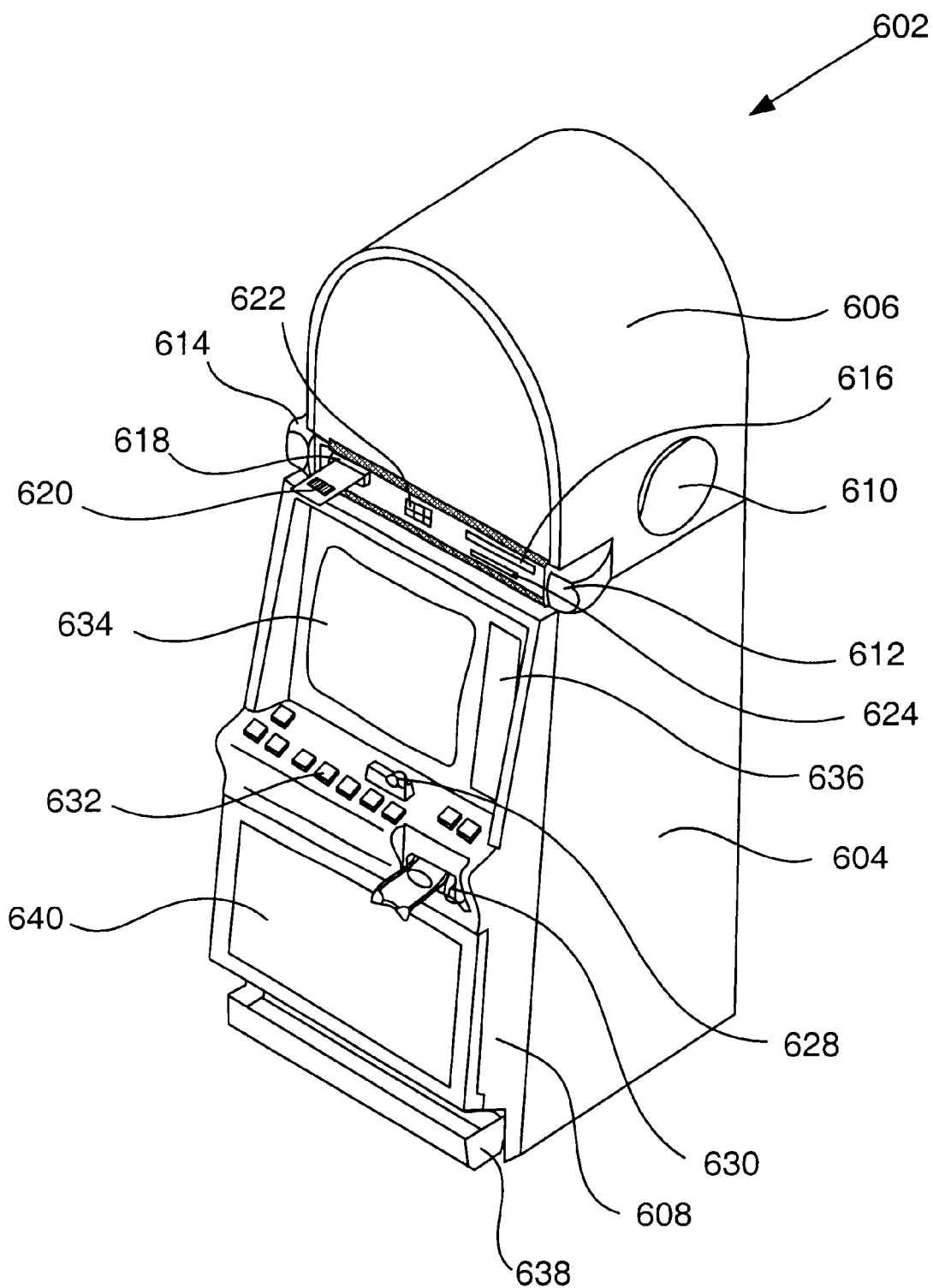
FIG. 6A is a perspective drawing of a gaming machine having a top box and other devices.

FIG. 6A is a perspective drawing of a gaming machine 600 having a top box 606 and other devices. Gaming machine 600 includes a main cabinet 604, which generally surrounds the machine interior (not shown) and is viewable by users. The main cabinet includes a main door 608 on the front of the machine, which opens to provide access to the interior of the machine. Attached to the main door are player-input switches or buttons 632, a coin acceptor 628, and a bill validator 630, a coin tray 638, and a belly glass 640. Viewable through the main door is a video display monitor 634 and an information panel 636. The display monitor 634 will typically be a cathode ray tube, high resolution flat-panel LCD, or other conventional electronically controlled video monitor. The information panel 636 may be a back-lit, silk screened glass panel with lettering to indicate general game information including, for example, a game denomination (e.g. $0.25 or $1). The bill validator 630, player-input switches 632, video display monitor 634, and information panel are devices used to play a game on the game machine 602. The devices are controlled by circuitry (e.g. the master gaming controller) housed inside the main cabinet 604 of the machine 602. Many possible games, including mechanical slot games and video games of chance including video slot games, video poker, video black jack, video pachinko, video card games, video bingo, video keno, video checkers and video lottery, may be provided with gaming machines of this invention.

The gaming machine 602 includes a top box 606, which sits on top of the main cabinet 604. The top box 606 houses a number of devices, which may be used to add features to a game being played on the gaming machine 602, including speakers 610, 612, 614, a ticket printer 618 which prints bar-coded tickets 620, a key pad 622 for entering player tracking information, a florescent display 616 for displaying player tracking information and a card reader 624 for entering a magnetic striped card containing player tracking information. The ticket printer 618 may be used to print tickets for a cashless ticketing system. Further, the top box 606 may house different or additional devices than shown in FIG. 6A. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 604 of the machine 602.

Understand that gaming machine 602 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Those of skill in the art will understand that the present invention, as described below, can be deployed on most any gaming machine now available or hereafter developed.

Returning to the example of FIG. 6A, when a user wishes to play the gaming machine 602, he or she inserts cash through the coin acceptor 628 or bill validator 630. Additionally, the bill validator may accept a printed ticket voucher which may be accepted by the bill validator 630 as an indicia of credit when a cashless ticketing system is used. At the start of the game, the player may enter playing tracking information using the card reader 624, the keypad 622, and the florescent display 616. Further, other game preferences of the player playing the game may be read from a card inserted into the card reader. During the game, the player views game information using the video display 634. Records of these transactions may be transmitted from the gaming machine 600 to a GTDR.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 632, the video display screen 634 or using some other device which enables a player to input information into the gaming machine. In some embodiments, the player may be able to access various game services such as concierge services and entertainment content services using the video display screen 634 and one more input devices.

During certain game events, the gaming machine 602 may display visual and auditory effects that can be perceived by the player. These effects add to the excitement of a game, which makes a player more likely to continue playing. Auditory effects include various sounds that are projected by the speakers 610, 612, 614. Visual effects include flashing lights, strobing lights or other patterns displayed from lights on the gaming machine 602 or from lights behind the belly glass 640. After the player has completed a game, the player may receive game tokens from the coin tray 638 or the ticket 620 from the printer 618, which may be used for further games or to redeem a prize. Further, the player may receive a ticket 620 for food, merchandise, or games from the printer 618.

Figure 6B:
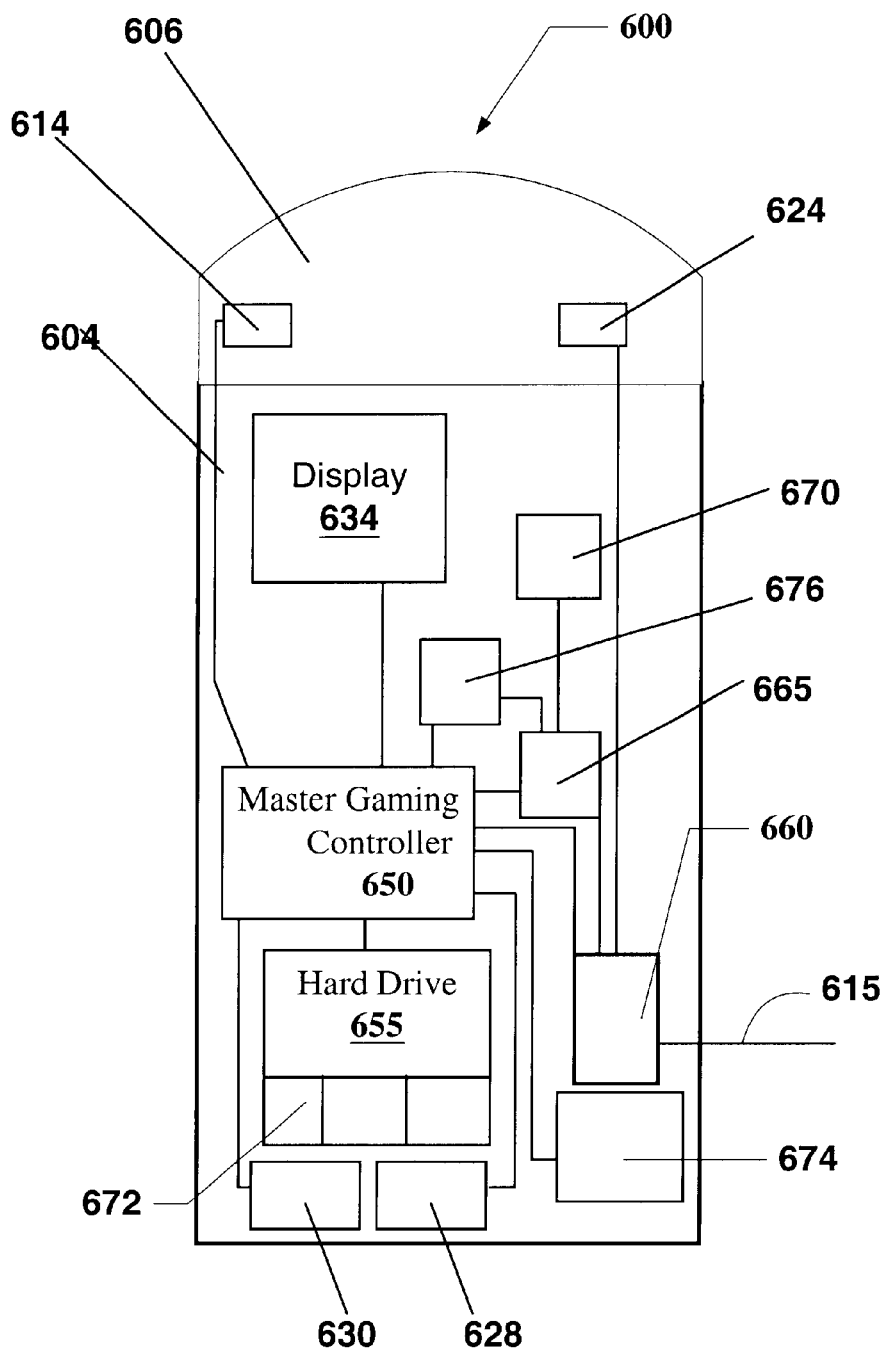
FIG. 6B is a block drawing of gaming components in a gaming machine.

FIG. 6B is a block diagram of components within a gaming machine 600 that may be used with the present invention. The game software components may be game system components (e.g. communication protocols, device drivers, event managers, etc.), game paytables, game bonusing, game graphics, game sounds, game progressives, game jurisdiction information and game networking. For example, the device drivers may allow communication between the master gaming controller 650 and a number of devices controlled by the master gaming controller 650 including the bill validator 630, the coin acceptor 628, the card reader 624 and the speaker 614. The game software components may be stored on a CD accessed using a CD-drive 674, a hard drive 655, a hard drive with a game software component partition 672 or other types of memory (not shown) including an EPROM, a flash memory, a ROM, a RAM, a DVD, a tape drive or non-volatile memory. In addition, game software version information corresponding to game software components stored on the gaming machine may also be stored in a memory of some type on the gaming machine.

The master gaming controller 650 may utilize processor logic to combine various game software components, as previously described, to present a game on the gaming machine. To alter the game play on a gaming machine, the master gaming controller 650 may receive game software components from a remote server such as a GTDR. For instance, using a first combination of game software components on the gaming machine, the master gaming controller may present a game presentation with a particular set of graphics and sounds. As described with reference to FIGS. 3 and 4, game software components with new graphics and new sounds may be downloaded to the gaming machine from the GTDR. The master gaming controller 650 may combine game software components from the first combination with the new graphical game software components and the new audio game software components to create a second combination of game software components. The second combination of game software components may be used to present a game on the gaming machine with the new graphics and sounds. Thus, as different game software components are downloaded from the GTDR, different combinations of game software components allowing different game play features may be generated by the master gaming controller 650.

The master gaming controller may communicate with a remote server such as a GTDR via a network interface on the main communication board 660 and the LAN 615. The LAN 615 may be an intranet, such as a casino area network, a cashless system network, a progressive game network, an accounting network and a bonus game network, or a wide area network, such as the Internet. To establish communications between the gaming machine 600 and the remote server, a wireless communication interface 670 such as a wireless modem connected to an antenna may be used or a wired communication interface, such as wired modem 676 connected to a phone line or Ethernet connection, may be used. To enable communications between the remote server and the gaming machine, a communication protocol such as TCP/IP may be used.

Illegal access to the gaming machine 600 may be prevented using the internal firewall 665. The internal firewall 665 is designed to prevent someone such as a hacker from gaining illegal access to the gaming machine and tampering with it in some manner. For instance, an illegal access may be an attempt to plant a program in the gaming machine that alters the operation of the gaming machine or allows someone to steal data. Firewalls used in the gaming machine may be provided by CISCO Systems (San Jose, Calif.).

Figure 7:
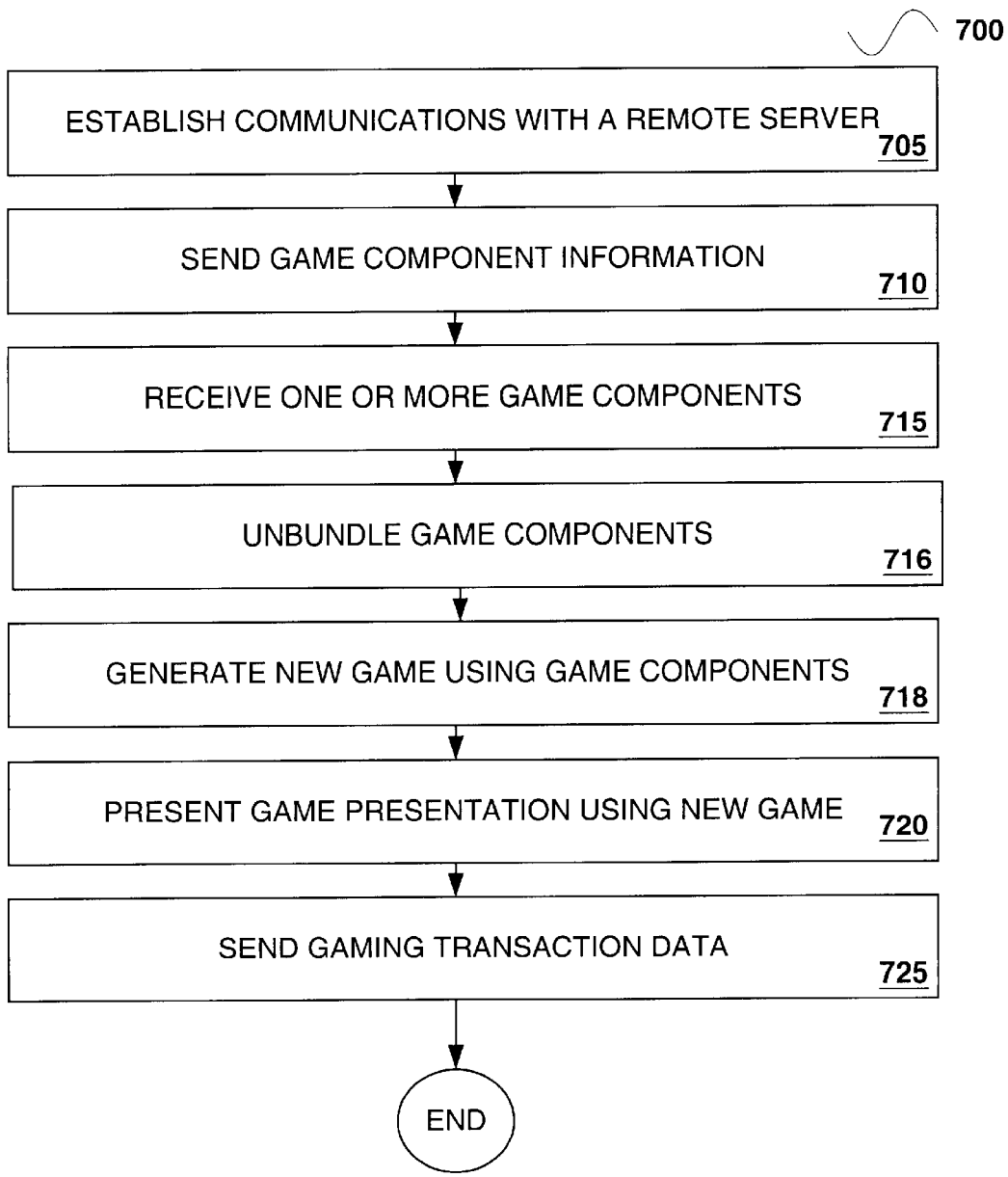
FIG. 7 is a flow chart depicting a method of updating game software components on a gaming machine using a remote server.

FIG. 7 is a flow chart depicting a method of updating game software components on a gaming machine using a remote server 700. In 705, communications are established with the remote server which may be a GTDR. The communications may be initiated by the gaming machine or by the remote server using an appropriate communication protocol such as TCP/IP. The gaming machine may establish communications with the remote server by contacting an ISP to establish an Internet connection. In 710, the gaming machine may send game software component information, such as a list of game software components currently being used on the gaming machine, a list of game software components stored on the gaming machine or game software component version information, to the remote server. In 715, the gaming machine may receive one or more game software components from the remote server where a plurality of game software components are used to present a game on the gaming machine. The game software components may include game system components, game paytables, game bonusing, game progressives, game graphics, game sounds, game jurisdiction information and game networking components.

In 716, the gaming machine may unbundle the game software components. In the unbundling process, the game software components may be decrypted, may be uncompressed, may be checked for viruses and may be reassembled from multiple components. After the new game software components are unbundled, in 718, a new combination of game software components may be assembled. The combination of game software components may include game software components received from the remote server as well as game software components previously stored and utilized on the gaming machine. When the downloaded game software components are used, the downloaded game software components may add additional or new game play features to a game presented on the gaming machine. In 720, the new combination of game software components may be used to present a game on the gaming machine. In 725, gaming transaction information generated from game play on the gaming machine may be sent to the remote server. The gaming transaction data may be sent at any time while communications are established with the gaming machine and is not limited to the sequence presented in the figure.

Figure 8:
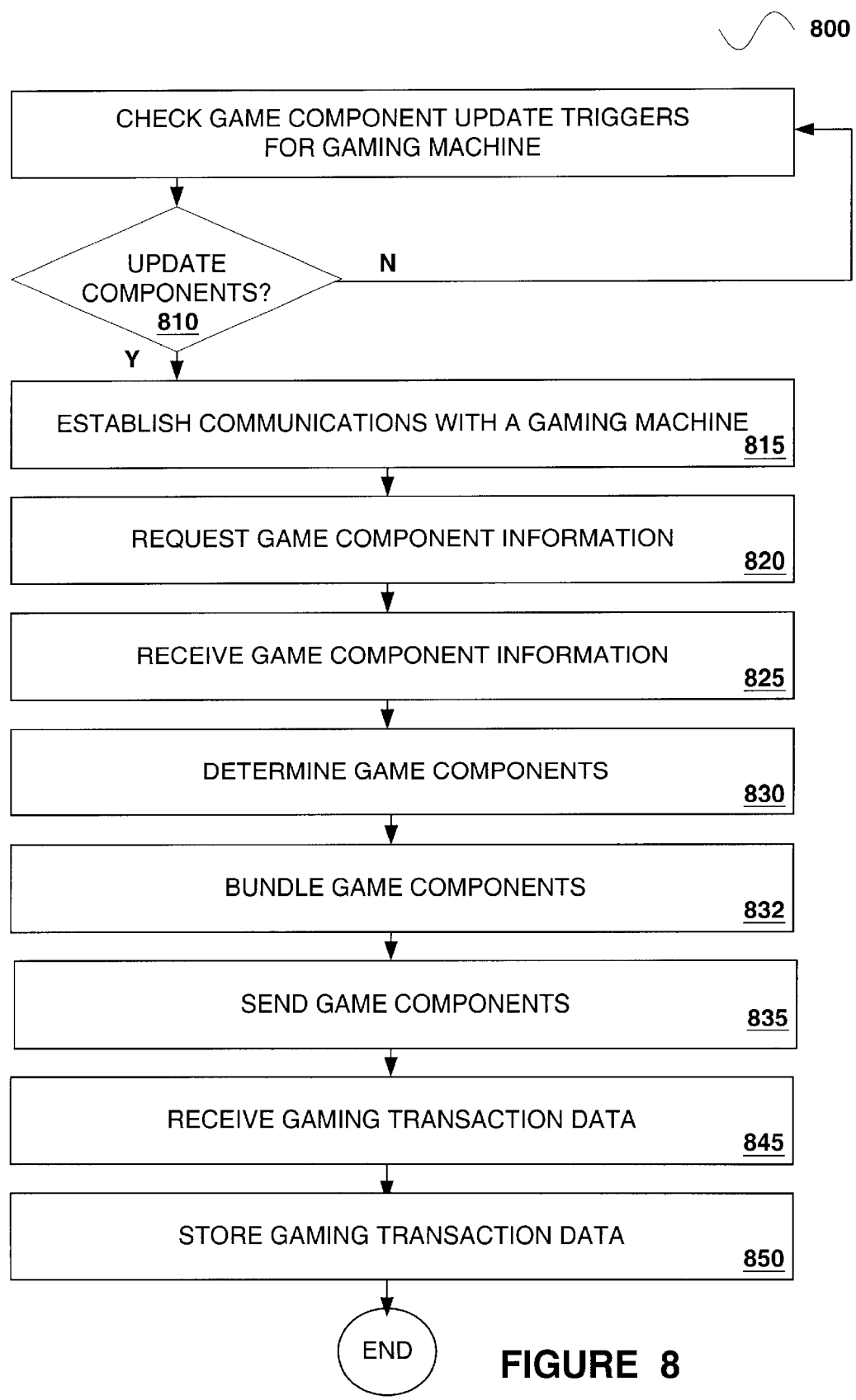
FIG. 8 is a flow chart depicting a method, in a remote server, of modifying game play on a plurality of gaming machines.

FIG. 8 is a flow chart depicting a method, in a remote server, of modifying game play on a plurality of gaming terminals 800. In 805, the remote server may check a list of update triggers that have been set for a particular gaming terminal. Many possible update triggers may be set for each gaming terminal. For instance, the update triggers may be an update time, an update day, an update week, a game event, game terminal performance criterion or a player input. A particular update may be also triggered by a combination of update triggers. For example, a game event during a certain period of time during the day may trigger an update of a game software component containing a paytable for a gaming machine.

For each gaming terminal, a list with one or more update triggers may be checked by the remote server. In 810, when the conditions of the one or more update triggers have not been satisfied for a gaming terminal or group of gaming terminals, the remote server may repeat 805 for another gaming terminal or group of gaming terminals. In 815, the remote server may establish communications with one or more gaming terminals, such as a gaming machine, that require an update of some type. To establish communications with the one or more gaming terminals, in some embodiments, the remote server may look up the IP address of the one or more gaming terminals and may contact a local ISP to send communications via the Internet. A TCP/IP communication protocol may be used for the communication process.

In 820, once communication has been established with at least one gaming terminal, the remote server may optionally request game component information from the gaming terminal such as game component software version information or a list of game software components stored on the gaming terminal. The remote server may store a record of this information. Thus, in some embodiments, a request for game software component information may be unnecessary. In 825, the remote server may receive a reply message from the gaming terminal containing game component information requested by the remote server in 820.

In 830, the remote server may determine a list of game software components to be sent to one or more gaming terminals. For instance, for a software update, the remote server may compare a list of game software component version information received from a particular gaming terminal with a list of software updates that are to be made and determine which game software components need to be downloaded to the gaming terminal. In another example, when a promotional update has been triggered, the remote server may download a number of game software components, such as paytables, game bonusing components, game graphics and game sound that enable the promotion.

In 832, the game software components may be retrieved from a memory location such as a hard drive or a CD in a CD-drive on the remote server and bundled so that the components may be downloaded to the gaming terminal. The bundling process may include encryption and compression of the game software components as well as encapsulating the game software components in one or more information packets. In addition, instructions describing the configuration of each game software component may be determined and included in the bundling process because each game software component may have a number of configuration options. The game software components may include but are not limited to game system components, game paytables, game bonusing, game progressives, game graphics, game sounds, game jurisdiction information and game networking components. Game networking components may include communication protocols allowing the gaming terminal to communicate with different gaming devices including the GTDR. In 835, the bundled game software components may be sent to one or more gaming terminals.

While update process in 805, 810, 815, 820, 830, 832 and 835 is being implemented by the remote server, the remote server may simultaneously receive 845 and store gaming transaction information data 850 from one or more gaming terminals. The gaming transaction information may be stored in one or more data categories including but not limited to game version data, game data, gaming terminal data, player data, route data and venue data.

To store the gaming transaction information in a particular category or to allow certain queries on the gaming transaction information stored in the database, the remote server may perform one or more operations on the data. Further, as described with reference to FIG. 5, access to the gaming transaction information may be accorded hierarchical access privileges. Thus, prior to storing the gaming transaction information, an access privilege may be assigned to the data.

The access privilege may be stored as a field in a record containing the data. The gaming transaction information may stored according to data partitions in a database where each data partition corresponds to a gaming entity. Thus, the remote server may determine the appropriate storage location any gaming transaction information received from a gaming terminal.

Figure 9:
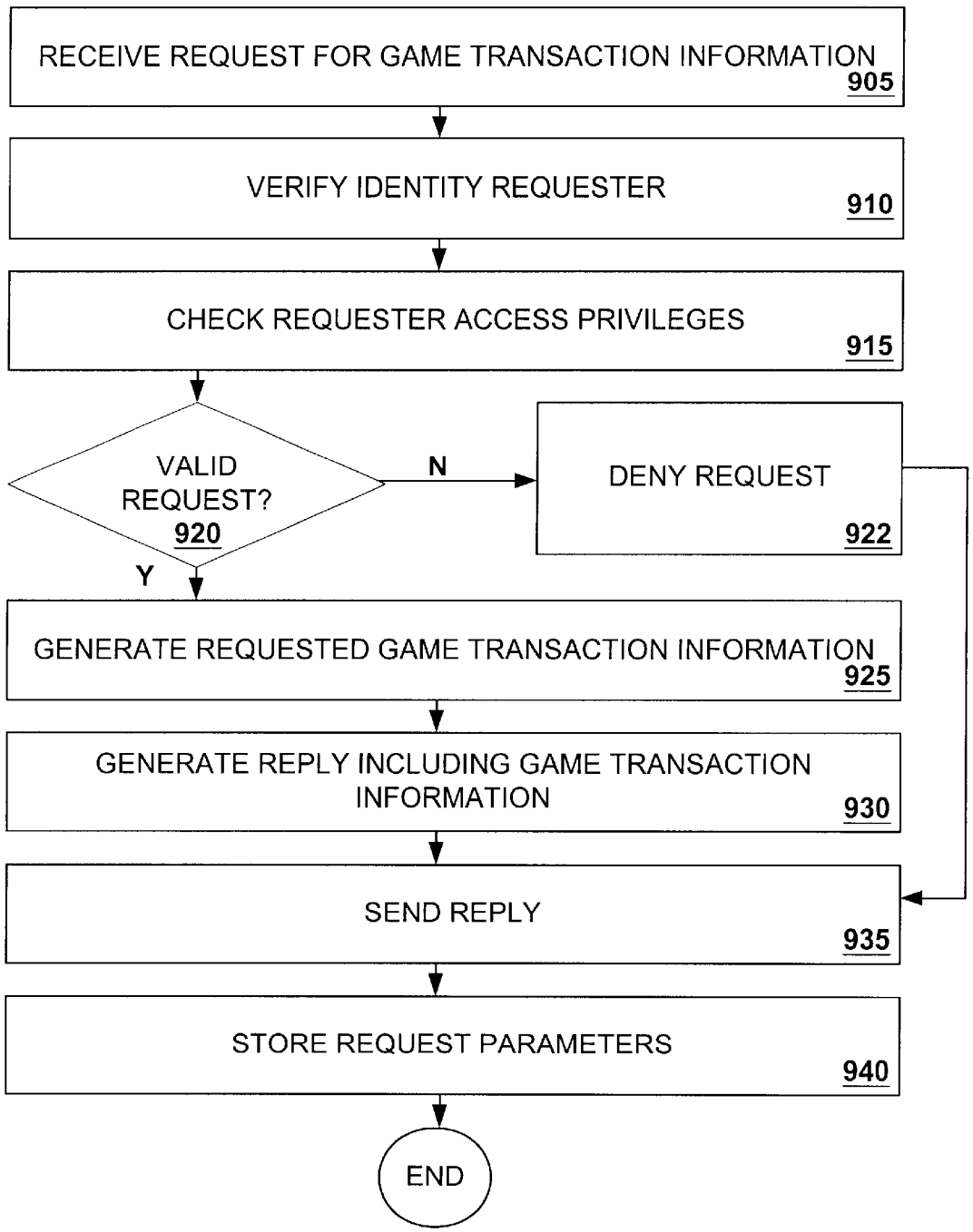
FIG. 9 is a flow chart depicting a method of accessing game transaction information on a partitioned database storing data from multiple different game entities.

FIG. 9 is a flow chart depicting a method 900 of accessing game transaction information on a partitioned database storing data from multiple different gaming entities. In 905, the remote server may receive a request for gaming transaction information from a gaming device such as a gaming machine or a remote computer. The gaming transaction information request may be generated from an application executed by the user on the remote server or on the gaming device. For example, the information request may be from a remote user operating from a remote computer. In 910, the remote server may verify the identity of the gaming machine and/or a user requesting the information. Thus, verification process may be based upon a password, biometric information such as fingerprint or combinations of both password and biometric information.

In 915, when the identity of a user has been verified, the remote server may determine the access privileges of the user such as the access privileges of a user group assigned to the user. The access privileges may delegated according to hierarchical groups as described with reference to FIG. 5. In 920, the remote server may compare access privileges assigned to the user with an access privilege needed for the information request. In 922, when the user does not have sufficient access privileges access to the gaming transaction information is denied. In 925, when the user has sufficient access privileges, the remote server generates the requested data. To generate the requested data, the remote server may have to retrieve the gaming information from one or more memory locations and perform one or more operations on the gaming information. The retrieval process may require searching a queryable database.

In 930, the remote server may generate a reply message containing the requested information. The data in the reply message may be encrypted and compressed. In 935, the remote server may send the reply message to a remote gaming device such as a gaming machine, another remote server, a remote computer or a printer. In 940, the remote server may store a record of the requested transaction. The transaction records may include a record of the type of queries made by the user. For instance, a user may request gaming information based upon specific request parameters such as for a specific gaming terminal, a specific player, a route, a venue or a period of time. The transaction records may be used to adjust the structure of the database storing the gaming transaction information and for application software utilizing the database such as a query configuration application. For instance, common query parameters may be added as data categories to the database and to a database graphical user interface using the query configuration application. The transaction records may also be used for billing purposes and for security purposes.

Although the foregoing invention has been described in some detail for purposes of clarity of understanding, it will be apparent that certain changes and modifications may be practiced within the scope of the appended claims. For instance, while the gaming machines of this invention have been depicted as having top box mounted on top of the main gaming machine cabinet, the use of gaming devices in accordance with this invention is not so limited. For example, gaming machine may be provided without a top box.

What is claimed is:

1. A gaming terminal data repository comprising;
   a network interface for communicating with a plurality of gaming terminals;
   a memory arranged to store a) gaming terminal transaction information received from the plurality of gaining terminals and b) game software components for use by the plurality of gaming terminals;
   a processor designed or configured i) to update game software components on said gaming terminals using one or more update triggers; ii) to receive game software component information from the gaming terminals wherein the game software component information describes game software components stored on the gaming terminals; iii) to download to the gaming terminals game software components wherein a plurality of said game software components are used to present a game of chance on each gaming terminal and wherein the gamins terminal data repository is capable of:
   a) determining a gaming jurisdiction where a particular gaining terminal is located;
   b) generating instructions for configuring same software components that comply with rules of the gaming jurisdiction and;
   c) sending the instructions for configuring the game software components to the particular gaming terminal.

2. The gaming terminal data repository of claim 1 further comprising:
   a firewall.

3. The gaming terminal data repository of claim 1, wherein the game software components are selected from the group consisting of game system components, game paytables, game bonusing, game progressives, game graphics, game sounds, game jurisdiction information and game networking components.

4. The gaming terminal data repository of claim 1, wherein the processor are designed or configured to execute one or more gaming repository applications.

5. The gaming terminal data repository of claim 4, wherein the gaming repository application are selected from the group consisting of a data analysis application, a configuration design application, a scheduling design application, report generation application, a query configuration application and a game software version management application.

6. The gaming terminal data repository of claim 1, wherein the game of chance is selected from the group consisting of a video bingo game, a video lottery game, a video blackjack game, a video slot game, a mechanical slot game, a video poker game, a video keno game, a video pachinko game, a video game of chance and a video card game.

7. The gaming terminal data repository of claim 1, wherein the game transaction information is stored according to one or more game data categories.

8. The gaming terminal data repository of claim 7, wherein the game data categories are selected from the group consisting of game version data, game data, gaming terminal data, player data, route data and venue data.

9. The gaming terminal data repository of claim 1 wherein the memory is a hard drive or a CD-RW drive.

10. The gaming terminal data repository of claim 1, wherein the network interface is a wireless network interface or a wired network interface.

11. The gaming terminal data repository of claim 1, wherein the network interface communicates with a remote gaming device.

12. The gaming terminal data repository of claim 11, wherein the remote gaming device is selected from the group consisting of a printer, a portable computer, a personal digital assistant and a computer.

13. The gaming terminal data repository of claim 1, wherein the gaming terminals and game software components are owned by a plurality of gaming entities.

14. The gaining terminal data repository of claim 13, wherein gaming transaction information and game software components owned by each gaming entity are stored in a separate gaming data partition in said memory.

15. The gaming terminal data repository of claim 13, wherein gaming transaction information and game software components owned by a first gaming entity are not accessible to a second gaming entity.

16. The gaming terminal data repository of claim 1, wherein the gaming terminal data repository is accessible to a plurality of different users and wherein the different users are grouped according to a plurality of hierarchical access groups.

17. The gaming terminal data repository of claim 16, wherein access to the gaming transaction information, the game software components and gaming repository applications stored on the gaming data repository by users in each of the hierarchical access groups is limited according to one or more hierarchical access privileges assigned to the hierarchical access group.

18. The gaming terminal data repository of claim 1, wherein the gaming transaction information and game software component information are stored in queryable and partitioned database.

19. The gaining terminal data repository of claim 1, wherein a plurality of game software components are combined into a game program for use by a first master gaming controller on a first gaming terminal to generate the game of chance played on the first gaming terminal.

20. The gaming terminal data repository of claim 1, wherein the processor is further designed or configured to generate a video display interface for configuring gaming terminals.

21. The gaming terminal data repository of claim 20, wherein the video display interface comprises templates for configuring gaming terminal.

22. The gaming terminal data repository of claim 21, wherein the video display interface is capable of displaying game software configuration information for each gaming terminal.

* * * * *